United States Patent
Kolan

(10) Patent No.: US 12,538,191 B2
(45) Date of Patent: Jan. 27, 2026

(54) METHODS AND APPARATUS FOR APPLICATION SERVICE RELOCATION FOR MULTIMEDIA EDGE SERVICES

(71) Applicant: Samsung Electronics Co., Ltd., Suwon-si (KR)

(72) Inventor: Prakash Kolan, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 784 days.

(21) Appl. No.: 17/836,957

(22) Filed: Jun. 9, 2022

(65) Prior Publication Data

US 2022/0417813 A1    Dec. 29, 2022

Related U.S. Application Data

(60) Provisional application No. 63/215,242, filed on Jun. 25, 2021.

(51) Int. Cl.
*H04W 36/00* (2009.01)

(52) U.S. Cl.
CPC .............. *H04W 36/00692* (2023.05)

(58) Field of Classification Search
CPC ........... H04W 36/00692; H04W 84/24; H04W 36/0033; H04L 67/327; H04L 45/22; H04L 67/1031; H04L 67/1038; H04L 67/42
See application file for complete search history.

(56) References Cited

U.S. PATENT DOCUMENTS

| | | |
|---|---|---|
| 2019/0045409 A1 | 2/2019 | Rasanen et al. |
| 2021/0058489 A1* | 2/2021 | Kim ................. H04W 36/125 |
| 2021/0059011 A1 | 2/2021 | Fang et al. |

(Continued)

FOREIGN PATENT DOCUMENTS

| | | |
|---|---|---|
| WO | 2020259428 A1 | 12/2020 |
| WO | 2020259509 A1 | 12/2020 |

(Continued)

OTHER PUBLICATIONS

International Search Report and Written Opinion issued Sep. 23, 2022 regarding International Application No. PCT/KR2022/009145, 8 pages.

(Continued)

*Primary Examiner* — Anthony S Addy

(57) ABSTRACT

An apparatus includes a includes a communication interface and a processor operably coupled to the communication interface. The communication interface receives signaling that indicates edge application service relocation for transferring a user equipment (UE) session for a UE to a target edge data network. The processor identifies an edge application service in the source edge data network processing media content corresponding to the UE session; generates a resource template for the edge application service including requirements for running the edge application service; transmits a request for the edge application service relocation to the target edge data network, the request including the resource template; and enables the edge application service relocation for the user equipment from the edge application service at the source edge data network to an edge application service at the target edge data network.

20 Claims, 11 Drawing Sheets

(56) References Cited

U.S. PATENT DOCUMENTS

2022/0116134 A1 4/2022 Yu et al.
2022/0124147 A1* 4/2022 Ge .................. H04L 47/781
2022/0386393 A1* 12/2022 Tamvada .............. H04W 48/18

FOREIGN PATENT DOCUMENTS

WO         2021040334  A1      3/2021
WO      WO-2022106019 A1  *   5/2022

OTHER PUBLICATIONS

"3rd Generation Partnership Project; Technical Specification Group Services and System Aspects; Study on 5G Media Streaming Extensions for Edge Processing (Release 17)", 3GPP TR 26.803 V2.0.0, Jun. 2021, 65 pages.
"5G; 5G Media Streaming (5GMS) Protocols (3GPP TS 26.512 version 17.0.0 Release 17)", ETSI TS 126 512 V17.0.0, Apr. 2022, 130 pages.
"5G; Architecture for enabling Edge Applications (3GPP TS 23.558 version 17.3.0 Release 17)", ETSI TS 123 558 V17.3.0, May 2022, 170 pages.
"Network Functions Virtualisation (NFV); Management and Orchestration; Report on Management and Orchestration Framework", ETSI GR NFV-MAN 001 V1.2.1, Dec. 2021, 181 pages.
"3rd Generation Partnership Project; Technical Specification Group Services and System Aspects; Study on 5G Media Streaming Extensions for Edge Processing (Release 17)", 3GPP TR 26.803 V17.0.0, Jun. 2021, 64 pages.
Extended European Search Report issued Oct. 14, 2024 regarding Application No. 22828844.5, 11 pages.
"3rd Generation Partnership Project; Technical Specification Group Services and System Aspects; Study on enhancement of support for Edge Computing in 5G Core network (5GC) (Release 17)", 3GPP TR 23.748 V1.2.0, Nov. 2020, 250 pages.
Huawei et al., "Edge service continuity procedure", 3GPP TSG-SA WG6 Meeting #38-e, S6-201139, Jul. 2020, 3 pages.
Convida Wireless LLC et al., "Solutions 20, 21 clean-up and conclusion to Key Issue#9 Preserving Service Continuity", 3GPP TSG-SA WG6 Meeting #34, S6-192340, Nov. 2019, 12 pages.

* cited by examiner

METHODS AND APPARATUS FOR APPLICATION SERVICE RELOCATION FOR MULTIMEDIA EDGE SERVICES

CROSS-REFERENCE TO RELATED APPLICATION AND PRIORITY CLAIM

This application claims priority under 35 U.S.C. § 119(e) to U.S. Provisional Patent Application No. 63/215,242 filed on Jun. 25, 2021, which is hereby incorporated by reference in its entirety.

TECHNICAL FIELD

This disclosure relates generally to firth generation (5G) multimedia edge service devices and processes. More specifically, this disclosure relates to methods and apparatus for application server relocation for 5G multimedia edge service.

BACKGROUND

Edge processing offers advantages for offering mobile operator services by deploying compute capacity closer to the edge i.e., closer to the end users. Different standard organizations such as 3rd generation partnership project (3GPP), moving picture experts group (MPEG), European telecommunication standards institute (ETSI), etc., have studied architectures for edge processing. 3GPP is currently standardizing architecture for offering edge-based services. 3GPP is also simultaneously standardizing architecture for a number of media services (e.g., media streaming, rendering in the cloud etc.). Most of these media services are to gain with a standardized edge-based architecture. Deploying these media services in the edge requires that the application servers/services providing the media service are always "available" and "closer" to the end user. In situations such as user mobility, fault tolerance, etc., it may be required that application services that are currently available in one (source) data network be relocated to a another (target) data network. Methods are presented for relocating application servers/services from source data network to target data network for optimal application performance.

SUMMARY

This disclosure provides methods and apparatus for application service relocation for 5G multimedia edge service.

In a first embodiment, an apparatus of a source edge data network includes a communication interface and a processor operably coupled to the communication interface. The communication interface is configured to receive signaling that indicates an edge application service relocation for transferring a user equipment (UE) session for a UE to a target edge data network. The processor is configured to identify an edge application service in the source edge data network processing media content corresponding to the UE session. The processor is also configured to generate a resource template for the edge application service including requirements for running the edge application service. The processor is further configured to transmit a request for the edge application service relocation to the target edge data network, the request including the resource template. The processor is additionally configured to enable the edge application service relocation for the user equipment from the edge application service at the source edge data network to an edge application service at the target edge data network.

In a second embodiment, a method includes for an edge application service relocation from a source edge data network to a target edge data network. The method includes receiving signaling that indicates edge an application service relocation for transferring a UE session to a target edge data network. The method also includes identifying an edge application service in the source edge data network processing media content corresponding to the UE session. In addition, the method includes generating a resource template for the edge application service including requirements for running the edge application service. The method further includes transmitting a request for the edge application service relocation to the target edge data network, the request including the resource template. The method additionally includes enabling the edge application service relocation for the UE session from the source edge data network to the target edge data network.

In a third embodiment, an apparatus of a target edge data network includes a communication interface and a processor operably coupled to the communication interface. The communication interface is configured to receive, from a source edge data network, a request for an edge application service relocation for a UE session receiving media content from an edge application service at the source edge data network, the request including a resource template to the target edge data network. The processor is configured to generate an edge application service based on the resource template. The processor is also configured to enable the edge application service relocation for the UE session from the edge application service at the source edge data network to the generated edge application service based on the resource template.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
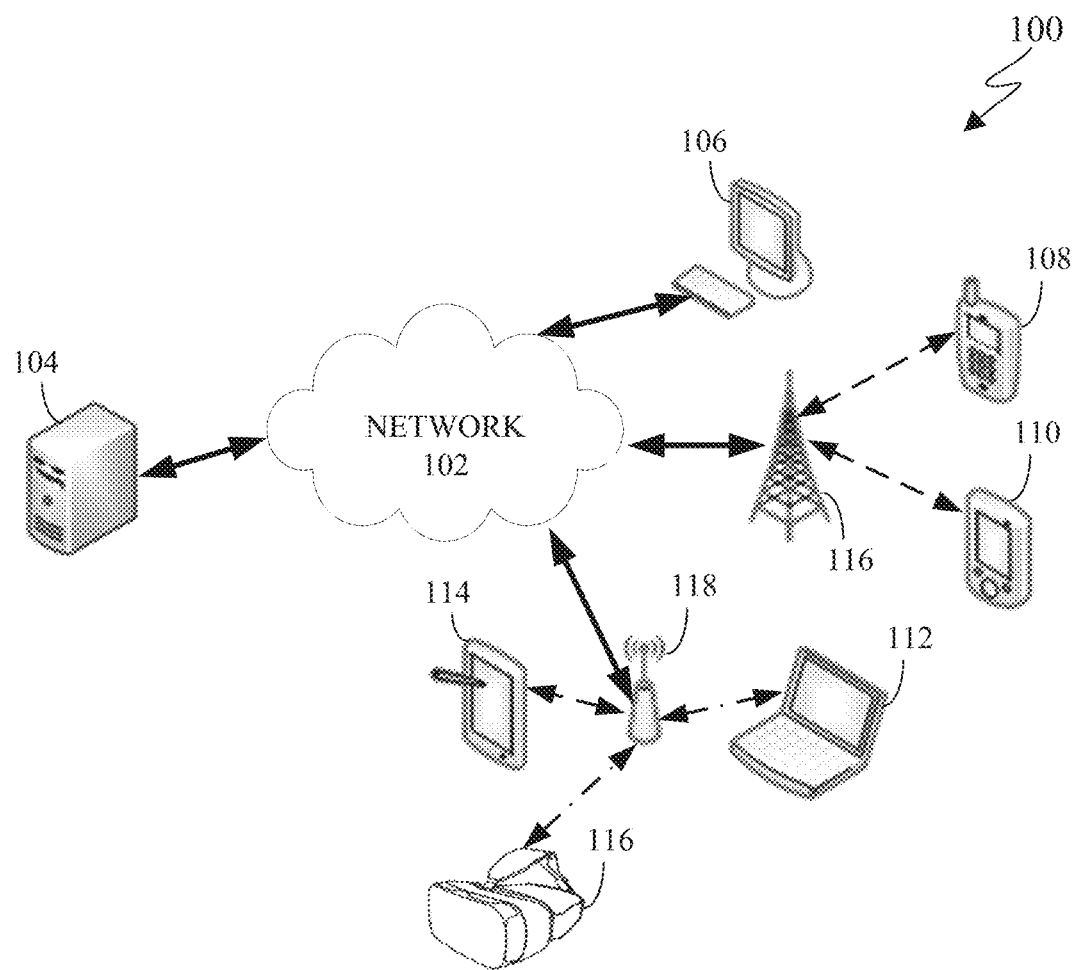
FIG. 1 illustrates an example communication system in accordance with an embodiment of this disclosure.

FIGS. 1 through 13, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

5G enables setting up application services closer to the end user using edge computing architectures. When there is a need for relocation (e.g., when user moves to a different location, fault tolerance, etc.), the application services that were serving the user have to be relocated as well. This application covers the aspects of application service relocation for 5G multimedia edge services.

This application describes aspects related to provisioning of methods for application service relocation when media services are deployed in edge data networks and there is a need for relocation, directory with application service resource configuration and key performance indicators (KPI) guarantees so relocation can be made with comparable resources and appropriate KPI, and Application service/server relocation in multi-application server deployments.

Embodiments of the present disclosure include a resource template structure for application service so it can be checked with target network if relocation can take place, Allocation of network buffers for temporary media content storage in edge data networks during application service relocation, application service directory with resource configuration information and KPI guarantees for each application service, and provisioning information for how the application service relocation is to be handled.

Advantages of these new features includes application services can be relocated, dynamically, if necessary, for optimal service performance to end users, inference of resource configuration for current application service so appropriate negotiations can happen with target data network to check for feasibility for relocation, and facilities for uninterrupted service during application service/server relocation using network buffer services and application service directory.

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power portable electronic devices often struggle to provide the processing capabilities to handle new services and applications, as newer services and applications often require more resources that is included in a portable electronic device. Improved methods and apparatus for configuring and deploying media processing in the network is required.

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required.

The figures discussed below, and the various embodiments used to describe the principles of the present disclosure in this' patent document are by way of illustration only and should not be construed in any way to limit the scope of the disclosure. Those skilled in the art will understand that the principles of the present disclosure may be implemented in any suitably-arranged system or device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s).

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
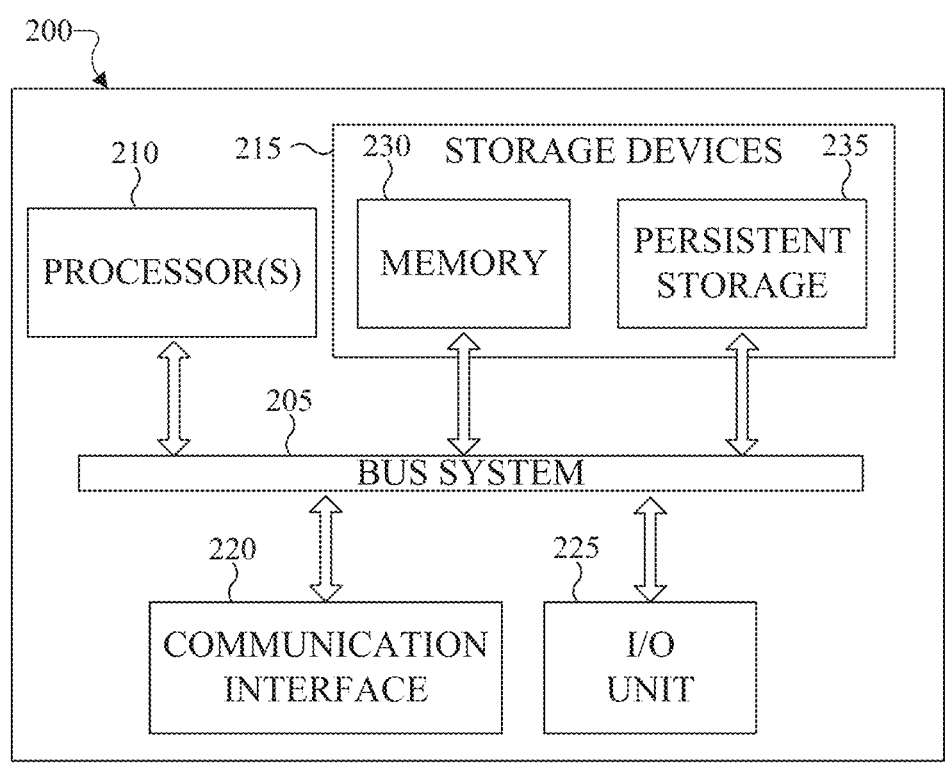
FIGS. 2 and 3 illustrate example electronic devices in accordance with an embodiment of this disclosure.
Figure 3:
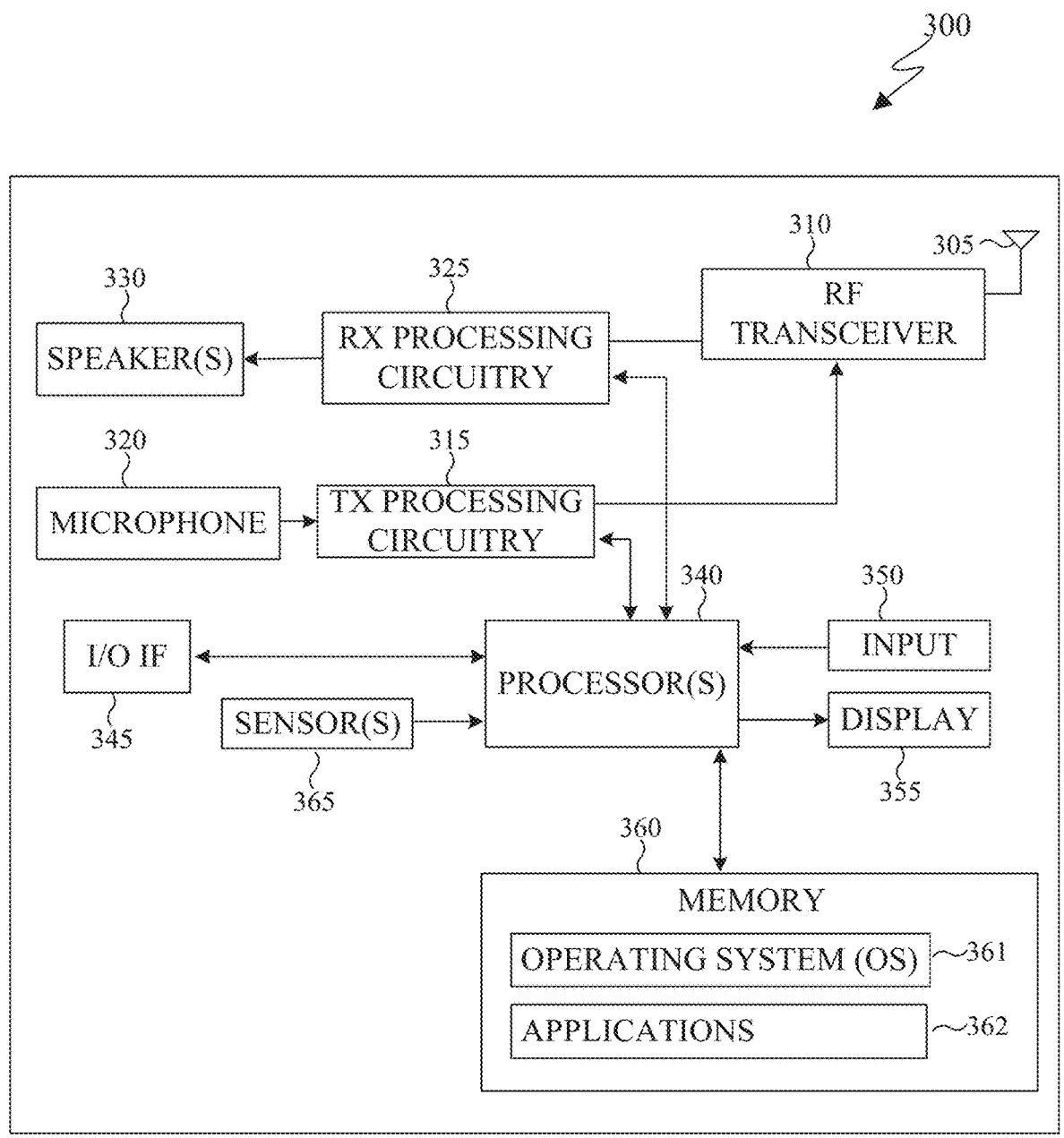

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can receive a signal indicating an edge application service relocation, identify an edge application service in a source edge data network, generate a resource template for the edge application service, transmit a request for the edge application service relocation; and enable an edge application service relocation to a target edge data network. In certain embodiments, the processor can receive an edge application service request from a source edge data network, generate an edge application service based on a resource template, and enable the edge application service for the UE session.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for receiving a signal indicating an edge application service relocation, identifying an edge application service in a source edge data network, generating a resource template for the edge application service, transmitting a request for the edge application service relocation; and enabling an edge application service relocation to a target edge data network. In certain embodiments, the instructions stored in the memory 230 can include instructions for receiving an edge application service request from a source edge data network, generating an edge application service based on a resource template, and enabling the edge application service for the UE session. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a resource template for an edge application service relocation such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can receive a signal indicating an edge application service relocation, identify an edge application service in a source edge data network, generate a resource template for the edge application service, transmit a request for the edge application service relocation; and enable an edge application service relocation to a target edge data network. In certain embodiments, the electronic device 300 can receive an edge application service request from a source edge data network, generate an edge application service based on a resource template, and enable the edge application service for the UE session.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
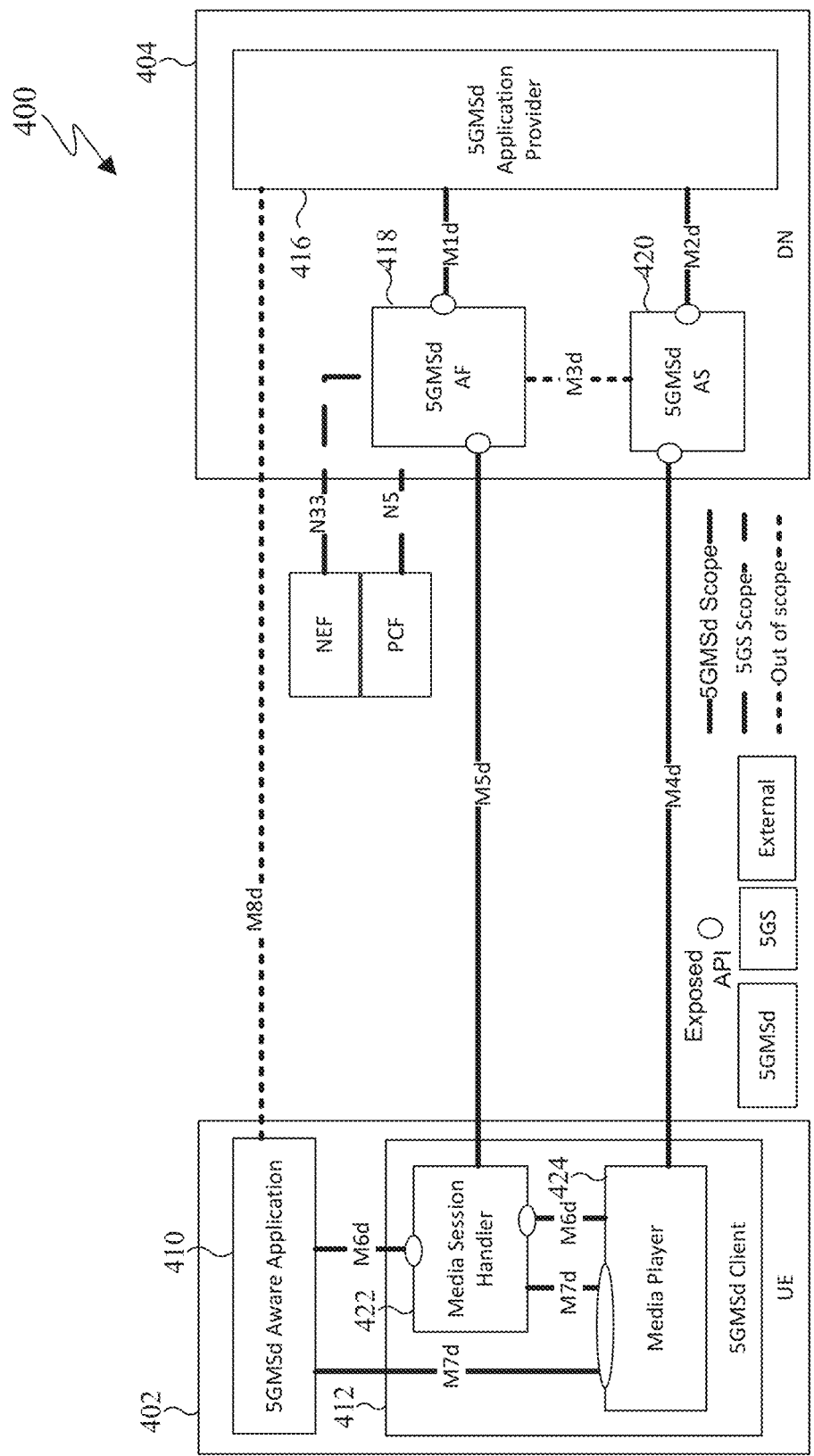
FIG. 4 illustrates an example architecture for media streaming in accordance with this disclosure.

FIG. 4 illustrates an example architecture 400 for media streaming in accordance with this disclosure. The embodiment of the media streaming architecture 400 illustrated in FIG. 4 is for illustration only. FIG. 4 does not limit the scope of this disclosure to any particular implementation of an electronic device.

5G media streaming is enabled by setting up application functions in a core network 404. A signaling application function server 418 that performs signaling function(s) and a media application function server 420 that performs media functions. There can be multiple instances of these application functions the core network 404 depending upon application requirements. Different components of UE 402 connect to these application functions to exchange signaling and media data to receive a 5G media streaming service offered by the mobile operator.

As shown in FIG. 4, 3GPP TS 26.512 specifies reference for media streaming architecture 400 for 5G media streaming (SGMS). 3GPP SA working group (WG) 4 (WG4) is standardizing media services for deployment in a 5G network. Different system components for 5G media streaming architecture 400 can include a UE 402 and a data network 404. The UE 402 can include an aware application 410, and an edge enabler client 412 (5GMSd client). The data network 404 can include an application provider 414 (5GMSd application provider), a signaling media function server 418 (5GMSd AF), and a processing media application function server (5GMSd) 420. The 5GMSd client 412 can include a media session handler 422 and a media player 424. The 5GMSd client 412 can correspond to the edge enabler client 412 shown in FIG. 4.

The aware application 410 is stored in the UE 402. The aware application 410 receives application service information from the application provider. The application service information is then used for retrieving information and data related to that application from the data network. The aware application 410 can correspond to the application client 510 shown in FIG. 5.

The signaling media function server 418 is a function in a data network 404 that performs signaling functions of the application service. The signaling media function server 418 provides various control functions to the media session handler on the UE 402 and/or the 5GMSd application provider. The signaling media function server 418 may relay or initiate a request for different policy or charging function (PCF) treatment or interact with other network functions.

The media application function server 420 is an application server that hosts media functions. The media application function server 420 is dedicated to media streaming. The media application function server 420 can stream volumetric media to the UE 402.

The media session handler 422 is a component of the UE 402 that enables communication with signaling media function server 418 in the data network 404. The communications with the signaling media function server 418 are for setting up the relevant media channels between the UE 402 and the data network 404.

The media player 424 is a component of the UE 402. The media player 424 can receive media data from the media application function in the data network 404. The media player 424 can provide data to the 5GMSd aware application 410.

Although FIG. 4 illustrates a media streaming architecture 400, various changes may be made to FIG. 4. For example, the media streaming architecture 400 and its individual components can vary as needed or desired. Also, the number and placement of various components of the media streaming architecture 400 can vary as needed or desired. In addition, the media streaming architecture 400 may be used in any other suitable media streaming process and is not limited to the specific processes described above.

Figure 5:
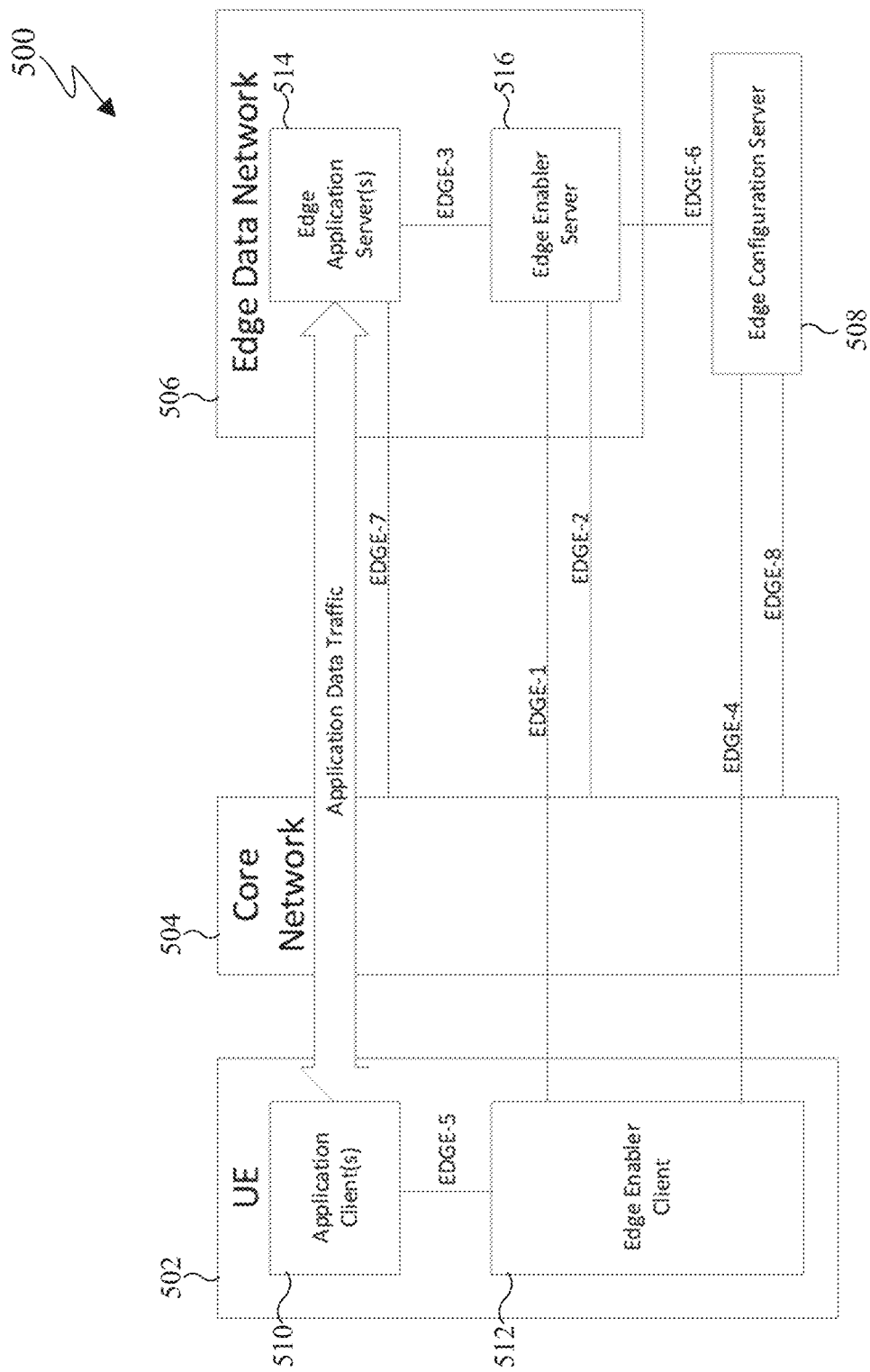
FIG. 5 illustrates an example architecture for enabling edge application in accordance with this disclosure.

FIG. 5 illustrates an example architecture 500 for enabling edge application in accordance with this disclosure. The embodiment of the edge application architecture 500 illustrated in FIG. 5 is for illustration only. FIG. 5 does not limit the scope of this disclosure to any particular implementation of an electronic device.

Volumetric content services are future media services that require enormous amount of processing (compute capacity) and bandwidth for transmission. However, media processing of volumetric content may not be possible in some of today's mobile terminals. 5G networks offer enough bandwidth to provide some volumetric services to end users. As a result, network processing of volumetric content is required before the final volumetric content is sent to users for consumption. Edge processing helps with such a requirement.

A number of sub-working groups in 3GPP have either studied or currently studying edge deployment as an enabler for providing services to end users that were other difficult to offer due to latency and buffering requirements. A working group is currently standardizing an application layer architecture for enabling edge applications as shown in FIG. 5.

As shown in FIG. 5, the edge application architecture 500 includes network components 502-408 and interfaces 510-416 between those network components that can offer edge-based applications. The network components 502-408 can include a user equipment (UE) 502, a core network 504, an edge data network 506, and an edge configuration server (ECS) 508. The interfaces 510-416 can include an application client 510, an edge enabler client 512, an edge application server 514, and an edge enabler server (EES) 516.

The UE 502 is a device that generates volumetric content related to a user and transmits the volumetric content to the edge data network. The UE 502 receives mixed volumetric content of other users in a conference setting and renders the volumetric content in the conference setting. The UE 502 can include the application client 510 and the edge enabler client 512.

The core network 504 can assign the UE 502 to a specific node in the edge data network 506. The core network 504 can direct volumetric content from the UE 502 and other UE to an edge data network 506.

The edge data network 506 can include media resource functions that operate to process and mix the volumetric content from the UE 502 and mix the content of other UE into a conference scene that is provided back to the UE 502. The edge data network 506 can include the edge application server 514 and the EES 516. A third-generation partnership project (3GPP) system architecture and services (SA2) sub working group (SWG) defines that an edge data network can be implemented as a Local Area Data Network (LADN). The premise of the edge data network is that it is closer to the UE, so therefore can provide services with better latency. Application services deployed within the edge data network process media destined to/originating from the UE for faster application performance.

The ECS 508 is a configuration server deployed in the edge data network 506 to offer services to edge enabler client 512 to discover the appropriate EES 516 and edge application servers 514. The ECS 508 provides supporting functions needed for the edge enabler client 512 to connect with an EES 516. The ECS 508 can provision of Edge configuration information to the edge enabler client 512. The configuration information can include information for the edge enabler client 512 to connect to the EES 516 and information for establishing a connection with EES s 516. The ECS 508 can support the functionalities of registration (i.e., registration, update, and de-registration) for the EES(s) 516.

The application client 510 is a client at the UE 502 (e.g., an app) that the service provider requires the users to have to use the service. The application client 510 is the application resident in the UE 502 performing client function(s).

The edge enabler client 512 is a client at the UE 502 that interfaces with services deployed at the mobile operator edge to provide required data to the application client 510. The edge enabler client 512 abstracts the delivery of data to the application client 510, so the application client 510 does not know whether the data is being retrieved through edge data network 506, core network 504, or service provider network. The edge enabler client 512 can retrieve and provision configuration information to enable the exchange of application data traffic with the edge application server 514.

The edge application server 514 is an application server deployed in the edge data network 506 for the mobile operator. The edge application server 514 is the application service resident in the edge data network 506, performing the server functions. The application client 510 of UE 502 can connect to the edge application server 514 in order to avail the services of the application with the benefits of edge computing.

The EES 516 provides supporting functions to enable exchange of traffic between edge enabler client 512 and edge application server 514. Such functions include discovery of edge application server 514, connection management between edge enabler client 512, ECS 508, and edge application servers 514.

The EES 516 can provision configuration information to the edge enabler client 512, enabling exchange of application data traffic with the edge application server 514. The EES 516 can interact with 3GPP core network 504 for accessing the capabilities of network functions. The EES 516 can support external exposure of 3GPP network and service capabilities to the edge application server(s) 514; support functionalities of registration (i.e., registration, update, and de-registration) for the edge enabler client(s) 512 and the edge application server(s) 514; and support the functionalities of triggering the edge application server 514 instantiation on demand.

Although FIG. 5 illustrates an edge application architecture 500 for enabling edge application, various changes may be made to FIG. 5. For example, the edge application architecture 500 and its individual components can vary as needed or desired. Also, the number and placement of various components of the edge application architecture 500 can vary as needed or desired. In addition, the edge application architecture 500 may be used in any other suitable volumetric conferencing process and is not limited to the specific processes described above.

Figure 6:
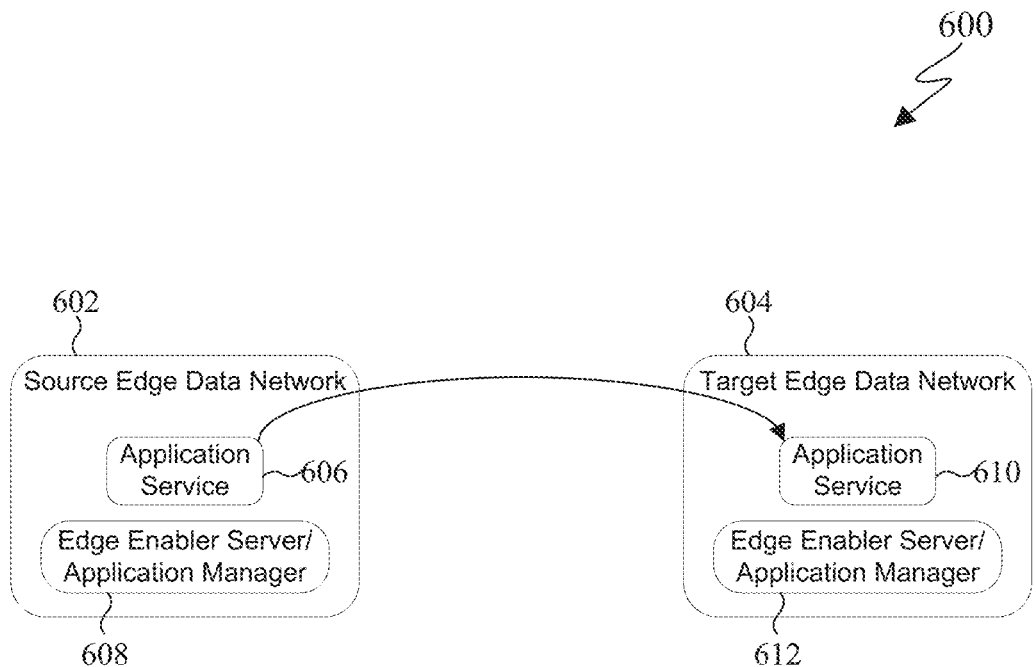
FIG. 6 illustrates an edge application service relocation in accordance with this disclosure.

FIG. 6 illustrates an edge application service relocation 600 in accordance with this disclosure. The embodiment of the edge application service relocation 600 illustrated in FIG. 6 is for illustration only. FIG. 6 does not limit the scope of this disclosure to any particular implementation of a 5G edge data network.

Application services for a UE session may need to be relocated when a media service is deployed using edge data networks. Edge application service relocation 600 can be deployed based on UE mobility, where a UE changes distances from different edge data networks affects connectivity. Edge application service relocation 600 can also be deployed for fault tolerances, where failures could occur in operation of application services. Edge application service relocation 600 additionally can be deployed for performance issues, where application services may provide different performance depending on an edge data network. For example, an edge data network may have better processing resources than a current edge data network. The edge application service relocation 600 can further be deployed based on operator agreements. Network operators may have multiple edge data networks provided by different edge computing service providers. The operator may have a more favorable agreement with a specific edge computing service provider over other edge computer service providers.

As shown in FIG. 6, a source application manager 608 has instantiated a source application service 606 that is currently operating in a source edge data network 602 and a target application manager 612 has instantiated a target application service 610 currently operating in a target edge data network 604. An edge application service relocation 600 can transfer a current application context information from a source application service 606 in a source edge data network 602 to a target application service 610 in a target edge data network 604. When new traffic comes in and a new request is received at the target edge data network 604, the application context information provides direction for the target edge data network 604 to know a state of the application for the UE session when a transfer is initiated. The application context information can be used in a manner for a seamless continuation of providing content for a UE session.

Although FIG. 6 illustrates an edge application service relocation 600, various changes may be made to FIG. 6. For example, the number and placement of various components of the edge application service relocation 600 can vary as needed or desired. In addition, the edge application service relocation 600 may be used in any other suitable edge application service relocation process and is not limited to the specific processes described above.

Figure 7:
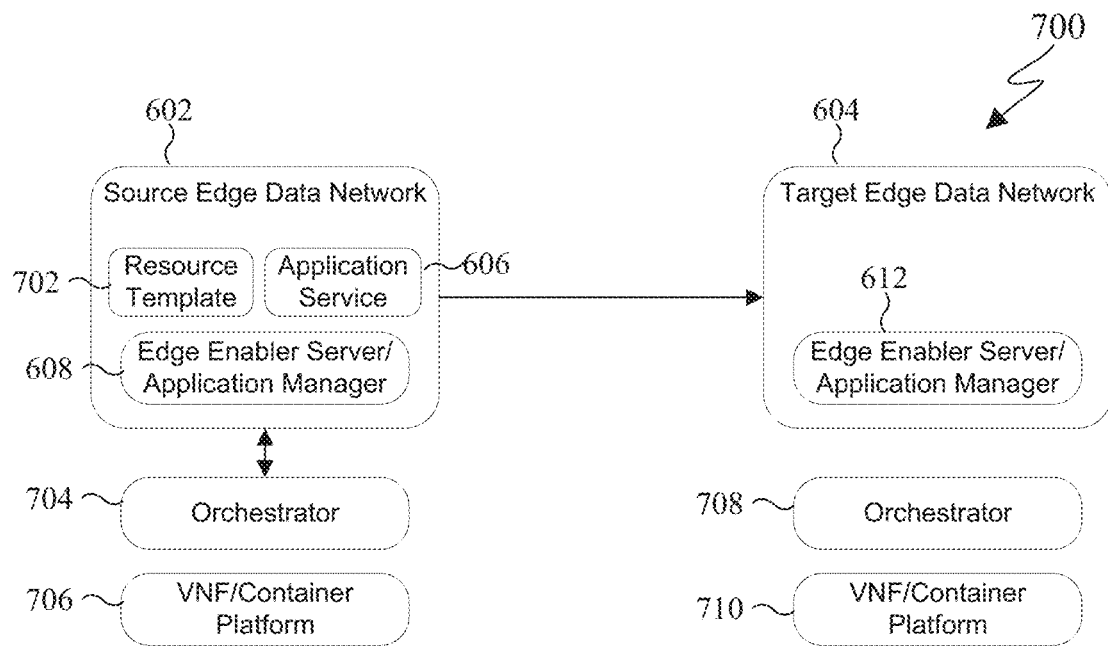
FIG. 7 illustrates an edge application service relocation with a resource template in accordance with this disclosure.

FIG. 7 illustrates an edge application service relocation 700 with a resource template in accordance with this disclosure. The embodiment of the edge application service relocation 700 illustrated in FIG. 7 is for illustration only. FIG. 7 does not limit the scope of this disclosure to any particular implementation of a 5G edge data network.

When there is a necessity to relocate the application server to a different edge data network, it is important that the application server has the same or more performance compared to the current application server. As shown in FIG. 7, the target edge data network 604 does not have a target application service 610 deployed for handling an edge application service relocation 600. In certain embodiments, the target application service 610 can be deployed but the application context may not be transferable. In this case, a resource template 702 shows a type of processing and resource facilities that are currently associated with the source application service 606 running in the source edge data network 602 that needs to be relocated. When the determination is made that the application service needs to be relocated, and the target network is identified, the resource template is exchanged between the source edge data network manager and the target edge data network manager. The structure of the resource template is provided in TABLE 1.

TABLE 1

RESOURCE TEMPLATE FOR APPLICATION SERVICE

| Parameter | Description | Action by the Target Data Network Manager |
|---|---|---|
| CPU cores, type, and capability information | Number of currently allocated CPU cores, their type information, and capability of each CPU core | Attempt to allocate the same number of CPU cores with comparable type and capabilities |
| GPU and capability information | Number of GPUs currently allocated for the application service, and their capability information | Attempt to allocate the same number of GPU with comparable type and capabilities |
| List of Processing Descriptors for processing running in source network that needs to be relocated. | | |

TABLE 1-continued

RESOURCE TEMPLATE FOR APPLICATION SERVICE

| Parameter | Description | Action by the Target Data Network Manager |
|---|---|---|
| Each Descriptor in this list has below details | | |
| VNF Package Descriptor | Details of VNF Descriptor that hosts the service to be deployed as a VNF<br>VNF descriptor comprises of all the elements of the vnfd descriptor specified in ETSI specification ETSI GS NFV-MAN 001 - "Network Functions Virtualisation (NFV); Management and Orchestration" at https://www.etsi.org/deliver/etsi_gs/nfv-man/001_099/001/01.01.01_60/gs_nfv-man001v010101p.pdf and ETSI GS NFV-IFA 011 - "Network Functions Virtualisation (NFV) Release 4; Management and Orchestration; VNF Descriptor and Package Specification" | Request target VNF orchestration platform to setup the VNF according to the VNF package descriptor |
| VNF platform | Platform for deploying the current processing descriptor as a VNF | Check to see if the target VNF platform matches this information. If there is a match, proceed with setting up the VNF according to the VNF package descriptor |
| Container Descriptor | Container Image that needs to be deployed on the Container platform<br>Container Descriptor comprises of all elements of the container descriptor specified in ETSI specification ETSI GS NFV-IFA 011 - "Network Functions Virtualisation (NFV) Release 4; Management and Orchestration; VNF Descriptor and Package Specification" | Request target container orchestration platform to setup the containers according to the Container descriptor |
| Container platform | Type of container platform that the current processing descriptor to be deployed onto | Check to see if the target container platform matches or supports this platform. If there is a match or support, proceed with setting up the containers according to the container descriptor |
| Access credentials | Credentials to access/download the VNF package or the Container onto the target platform | Use access credentials to download the requisite VNF or container packages to the target VNF/container platform |
| Deployment order | Order of deploying the current descriptor within the set of all processing descriptors | Deploy the VNF or the container according to the deployment order specified using this field |
| Configuration Descriptor | Configuration information that needs to be fetched for configuring the current descriptor | Downloads the configuration information using this descriptor and applies to the processing running on the VNF or container instance |
| → Security Descriptor | Security information that needs to be fetched for configuring the security of the processing in the current processing descriptor | Applies the security configuration as specified in this descriptor to the VNF or container instance that is running the application processing |
| Firewall Port map | List of open firewall open ports | Opens firewall ports upon deployment of application service |

The resource template 702 can be generated by the source edge data network 602 and transferred to the target edge data network 604. The target application manager 612 can use the resource template 702 to instantiate the target application service 610 in the target edge data network 604.

The source orchestrator 704 may manage and maintain overall functions of the source edge data network 602 based data transmission on the basis of at least one of an available resource, an available application service, an application rule and requirements, an operator's policy, or topology. The target orchestrator 708 provides similar functionality for the target edge data network. 604.

A source virtual network functions (VNF) platform 706 can deliver network functions related to the UE session of the source application service 606 for the source edge data network 602. A target VNF platform 710 can provide similar services to the target edge data network 604.

When the target application manager 612 in the target edge data network 604 receives the resource template 702 for source application service 606, the target application manager 612 in target edge data network 604 may use the parameters in resource template 702 to provision the target application service 610 as given in the processing descriptor. This can be a default mode where the target application manager 612 can download required images and setup the processing in the target edge data network 604.

In certain embodiments, the target application service 610 may not be possible to instantiate the target application service 610 by the target application manager 612 in target edge data network 604 based on requirements in the resource template 702. In this case, the target application manager 612 can split processing content into multiple processing steps and can deploy each processing step as a separate target application services 610 in the target edge data network 604. When the decision to do this happens, the target application manager 612 in the target edge data network 604 can inform the source application manager 608 in the source edge data network 602 of such division and pass different required endpoints for sending media content to the UE. The source application manager 608 in the source edge data network 602 can forward information to the UE that is received.

In certain embodiments, the target application service 610 may be possible to instantiate combined functionality of multiple source application service 606. This is the option of combining application processing of multiple source application service 606 to fewer target application services 610. Similar to the previous case, the target application manager 612 in the target edge data network 604 can inform the source application manager 608 in the source edge data network 602 of such combining of application processing and updated endpoint information, which the source application manager 608 can forward to the UE.

In certain embodiments, the target application manager 612 in target edge data network 604 use a network service with directory information of division/fusion of application processes described in the previous steps for deciding on the application services that need to be deployed in the target edge data network 604. The directory provides both a forward mapping of application services (e.g., a reduction of processing descriptors—e.g., mapping multiple VNFs/Container images to one VNF/Container) and reverse mapping (e.g., an increase in processing descriptors—e.g., mapping one VNF/container image to multiple VNFs/Containers).

Although FIG. 7 illustrates an edge application service relocation 700 with a resource template 702, various changes may be made to FIG. 7. For example, the number and placement of various components of the edge application service relocation 700 can vary as needed or desired.

Figure 8:
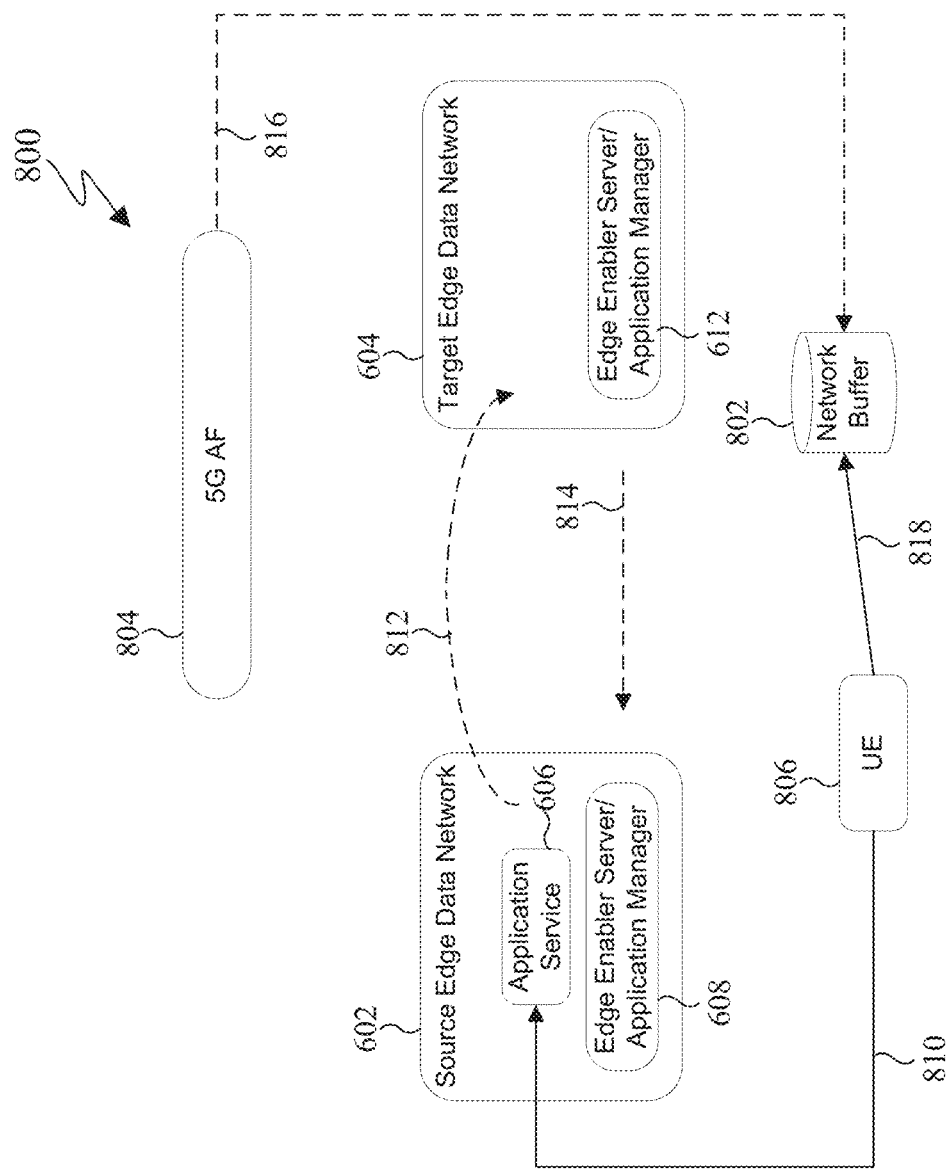
FIG. 8 illustrates an edge application service relocation with a network buffer service in accordance with this disclosure.

FIG. 8 illustrates an edge application service relocation 800 with a network media buffer 802 in accordance with this disclosure. The embodiment of the edge application service relocation 800 illustrated in FIG. 8 is for illustration only. FIG. 8 does not limit the scope of this disclosure to any particular implementation of a 5G edge data network.

As shown in FIG. 8, a 5G application manager (AF) 804 during setting up of computing resources in target edge data network 604 for a relocation request, can create a network media buffer 802 so the UE session 806 can temporarily send media content to the buffer while the relocation is being performed. In this case, until the application service is completely relocated, the network media buffer 802 can buffer media content to and from the UE session 806.

In certain embodiments, relocation can be prompted in step 810. The relocation can be prompted based on the UE being closer to the target edge data network 604 than the source edge data network 602. The source edge data network 602 transmits a request for application service relocation to the target edge data network 604 in step 812. The target edge data network 604 transmit a response that the application service instantiation is in progress to the source edge data network 602 in step 814. Relocation of the UE session or instantiation of a target application service can take a substantial amount of time, for example, 10 minutes. During this time period, the 5G AF 804 instantiates a network media buffer 802, in step 816, in order to for the UE sessions 806 to continue to seamlessly receive the content originally provided from the source edge data network 602 in step 818.

Typically, such a buffer service can be a REST endpoint that allows for creation, modification, and termination of media buffer objects. It is highly probable that the 5G AF 804 sets up such a network media buffer 802 in the target edge data network 604 so once the application service is completely relocated, sending media content from network media buffer 802 to the target application service 610 in target edge data network 604 would be seamless. However, locating the network media buffer 802 in the target edge data network 604 is not necessary. The 5G AF 804 can choose to set the network media buffer 802 in a different location (e.g., source edge data network 602, core network, etc.).

When the 5G AF 804 that is managing the 5G AS comes to know that the source application service 606 running on the 5G AS needs to be relocated, the 5G AF 804 informs the UE 806 about one or more conditions. In certain embodiments, 5G AF 804 informs the UE 806 that the UE 806 should expect a change in the endpoint information of the 5G AS that the UE 806 is currently interacting with. Especially for uplink streaming kind of use cases where the UE 806 needs to the know the endpoint of the 5G AS so it can stream media content to the 5G AS. Examples of the messaging to support edge application service relocation from the 5G AF 804 to the UE 806 can be found in TABLE 2.

TABLE 2

EDGE APPLICATION SERVICE RELOCATION MESSAGES

| Message | Description |
|---|---|
| Change in UE endpoint information | UE should start sending to a different upstream endpoint (e.g., for uplink use cases) |
| Change in network endpoint information | UE to receive media from a different network endpoint (e.g., for downlink use cases) |
| Network-buffer | Endpoint information of network buffer service |
| Stream duplication | Duplicate stream to source and target network until the EAS relocation is complete |
| Use metrics to check geographic proximity | Use metrics to check which among the source/target/network buffer service is close so UE can send to that option while EAS relocation is still happening |
| Option to send to source target or network buffer while EAS relocation is taking place | Mandatory option guidance from AF to UE |
| UE buffer content | Option to buffer content for a certain period of time while EAS relocation is still happening |
| Split processing in target network | AF may decide to split processing of one EAS in source network to multiple EASes in target network<br>In this case, AF may inform UE to send content to more than one EAS in target network |
| Pause execution | AF informs UE to pause execution until EAS relocation is complete |
| Stop execution | AF informs UE to cease sending media content to old EAS in source network |

In certain embodiments, the one or more conditions can include cases where the UE 806 is receiving downlink media stream from the network/cloud/AS, the 5G AF 804 may inform the UE 806 that the source of the downlink media stream could be different compared to the source of the downlink media stream when the relocation did not happen/start.

The one or more conditions can include when the 5G AF 804 may indicate to the UE 806 that the endpoint information of a media content buffer in the network that the UE 806 can send the upstream media content while the 5G AF 804 in the target edge data network 604 is setting up the application service instance. Once the application service instance is setup in the target edge data network 604 and ready to accept media content, a 5G AF in the source edge data network 602 may interact with the 5G AF 804 in the target edge data network 604 to forward the media content from the network media buffer 802 to the application service instance in the target edge data network 604.

The one or more conditions can also include when the 5G AF 804 informs the UE 806 with the updated endpoint information of the relocated 5G AS, and requests the UE 806 to start sending the upstream media content to the relocated 5G AS.

The one or more conditions can further include when the 5G AF 804 may inform the UE 806 to duplicate the upstream media content to both the old the application service instance in the source edge data network 602 and the application service instance in the target edge data network 604 or the network media buffer 802 that the 5G AF 804 in the source edge data network 602 or target edge data network 604 may temporarily allocate during the relocation.

The one or more conditions can additionally include when the 5G AF 804 may indicate to the UE 806 to use metrics from the application to infer which network among the source edge data network 602 and target edge data network 604 is closer to the UE 806, and depending on the geographic proximity, the UE 806 may send upstream media content to the closer edge data network among the source edge data network 602 and target edge data network 604 or the network media buffer 802.

The one or more conditions may also include when the 5G AF 804 may indicate to the UE 806 that irrespective of which data network that the UE 806 is closer to, the UE 806 has to send the media content to one among the source edge data network 602 or the target edge data network 604 or the network media buffer 802 defined above until the 5G AF 804 informs the UE 806 to cease sending media content to only to application service instance in the target edge data network 604.

The one or more conditions may further include when the 5G AF 804 may indicate to the UE 806 that the UE 806 buffer outgoing media content for a certain period of time (rolling buffer) while the target edge data network 604 need some time for setup of the target application service 610. This may be done when instantiation of a network media buffer 802 is not possible.

Additionally, the one or more conditions may include when the 5G AF 804 may decide to split application processing that is currently performed in the source edge data network 602 to multiple different application service instances in the target edge data network 604, where each application instance in the target edge data network 604 could be performing different functionalities. In this case, the 5G AF 804 may inform the UE 806 that the UE 806 is to start sending the media content to more than one application service instance in the target edge data network 604. In certain embodiments, the 5G AF 804 could inform the UE 806 of a network media buffer 802 described above differently for each of the split application service instances in the target edge data network 604.

The one or more condition may also include when the 5G AF 804 may also indicate to the UE 806 that the UE 806 temporarily pause execution of the application until the 5G AF 804 indicates the UE 806 to resume the application to send or receive media content.

Furthermore, the one or more conditions can include when the 5G AF 804 informs the UE 806 that it ceases sending the upstream media content to the old application service instance in the source edge data network 602.

The 5G AF that is responsible for relocating the application service instance running inside the 5G AS does so while estimating the current KPIs that are currently available at the source edge hosting environment and checking with the application manager at the target edge hosting environment if such KPIs can be provided and guaranteed. To support this, the 5G AF interacting with the UE performs specified actions, shown in TABLE 3 below.

TABLE 3

PROCESSES WITH KPI GUARANTEES

| Process | Description |
| --- | --- |
| Go ahead with EAS relocation irrespective of KPI guarantees | |
| Deny EAS relocation and inform UE that application performance may degrade with EAS relocation | |
| Fallback service guarantees using fallback application descriptor | Provides fallback option for service performance in case the EAS relocation cannot happen as per KPIs Reduced application performance (e.g., convert to 4K instead of 8K) |

The specified actions can include when the 5G AF 804 estimates the KPIs (both end to end (E2E) and per application service instance) at the source edge hosting environment. One way to estimate the KPIs is to get supported metrics from network data analytics function (NWDAF), a network analytics function supported by 5G architecture standardized in 3GPP. Supported metrics could include the user experience metrics provided by NWDAF to registered subscribers.

The specified action can also include when the 5G AF 804 constructs a descriptor with KPI values and checks with the AF in the target edge hosting environment if all the KPIs can be satisfied/guaranteed upon relocating application service instance to that target edge hosting environment.

When the application manager in the target edge data network 604 receives a request from the source application manager 608 in source edge data network 602 with requisite KPI information, the target application manager 612 in the target edge data network 604 may perform one or more specified actions.

The specified actions can include when the target application manager 612 processes the above request to infer the KPI in the target edge data network 604 based on the planned deployment described earlier, which is done for any of the deployment strategy (e.g., deploy similar application service, break down one service to multiple services, or combine multiple services to one/few services using for example the network directory service described earlier). To support estimating the KPI, each of the application service in the network directory service described earlier can hold probable KPI guarantees, e.g., based on past history depending on their usage. With this information available, the target application manager 612 in the target edge data network 604 can inform the source application manager 608 in the source edge data network 602 whether the target edge data network 604 can provide requisite KPI guarantees once the service is relocated to the target edge data network 604.

Another specified action can include when the target application manager 612 in the target edge data network 604 cannot satisfy the requested KPI guarantees, the target application manager 612 can inform the source application manager 608 in the source edge data network 602 or the 5G AF 804 about the same. In this case, the 5G AF managing the relocation may perform any of the following sub-actions.

One of the sub-action can include when the 5G AF 804 managing the relocation may still go ahead with the relocation in spite of no guarantees of the 5G KPI for the media service. The 5G AF 804 can select this option based on provisioning information provided by the application service provider when the service was provisioned.

Another sub-action can include when the 5G AF 804 may decide the keep the application service instance running in the source edge data network 602 and avoid relocation. In this case, the 5G AF 804 can inform the UE 806 that the relocation is not possible, and the UE 806 may expect KPI and application performance degradation.

The sub-actions can also include when the 5G AF 804 may optionally indicate to the UE 806 about the inability to relocate the application service, and therefore the UE 806 may switch to a mode where the application provides a lower performance. For example, if the UE 806 is receiving an 8K stream is attempting to relocate, the service may provide an HD stream or a 4K stream because of the inability to perform the relocation. The 5G AF 804 can use this option if the external application service provider has allowed for such switching of application parameters when the service was provisioned (or updated later with such information). The parameters with lower application performance are also provided by the external application service provider during the service provisioning stage.

Although FIG. 8 illustrates an edge application service relocation 800 with a network media buffer 802, various changes may be made to FIG. 8. For example, the number and placement of various components of the edge application service relocation 800 can vary as needed or desired.

Figure 9:
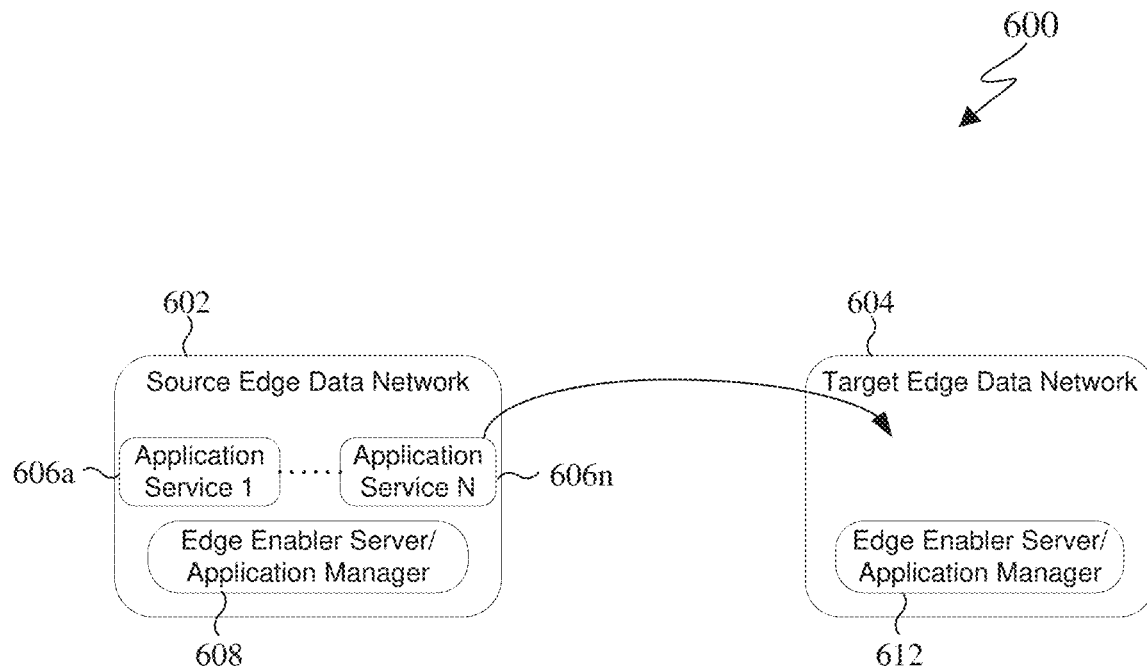
FIG. 9 illustrates a multi edge application service relocation with a resource template in accordance with this disclosure.

FIG. 9 illustrates a multi edge application service relocation 900 with a resource template in accordance with this disclosure. The embodiment of the edge application service relocation 900 illustrated in FIG. 9 is for illustration only. FIG. 9 does not limit the scope of this disclosure to any particular implementation of a 5G edge data network.

When a media service is delivered to users using network edge, it is highly likely that there are multiple application services 606a-606n of different types executing in an edge data network that operate on the media stream before the resultant media content is sent downstream to the UE or upstream to a different network entity.

In case there are multiple application services, and there is a need to relocate the application services, then the application manager of the source data network or the AF managing the relocation can perform any of the following actions relocate all the application services to the target data network, relocate a select set of application services to the target data network and keep the remaining application services running in the source data network, and inform the UE that the relocation cannot happen because not all application services can be relocated to the target data network.

The method of relocation is based on the functionality of the end-to-end service, and provisioning information from the external application service provider to the AF while the service was setup. In case of multiple application services that need to be relocated, the AF managing the relocation, or the application manager in source data network, can do the procedures described earlier on a per-application service/server basis.

The 5G Application Service Provider, when provisions an application for deployment (example using the M1d interface specified in FIG. 4), can specify whether or not an application deployed in an edge data network can be relocated, and support for such relocation. To facilitate such kind of provisioning, the M1 interface can be enhanced with the Edge Application Relocation Template structure with fields including allow-edge-application-relocation, relocation-map, default-resource-template, allow-service-split-during-relocation, allow-service-fusion-during-relocation, application-service-directory, image-registry, support-network-buffering, network-buffer-service, allow-media-duplication, media-duplication-time-period, allow-metric-inference, metrics-benchmark, force-media-location, client-buffering-interval, client-pause-execution, client-cease-execution, allow-relocation-with-no-kpi-guarantees, terminate-application-if-no-kpi-guarantees, Fallback-application-descriptor, and all-or-none-relocation.

The allow-edge-application-relocation field can be a Boolean variable indicating whether edge application service relocation is permitted. Values for the Boolean variable can include "True" for when a 5G operator is allowed to relocate edge application servers or services to a different edge data network and "False" for when a 5G operator is not allowed to relocate edge application servers or services to a different edge data network.

The relocation-map field can be a map providing allowed relocation from a given source edge data network 602 to a list of target edge data networks 604. The key of the map is the source network identifier, and value is a list of target edge data network identifiers to which relocation from the source edge data network 602 is allowed.

The default-resource-template field can provide a set of default values for resource template described earlier. If no resource template is provided from the source edge data network 602 to the target edge data network 604 as previously described, then the operator can use the default resource template specified as part of the service provisioning to use for estimating the resources for relocation. To support appropriate resource information as part of the default resource template, the 5G application service provider can retrieve information from time to time about resources currently allocated to the application service in the source data network. This can be achieved by the exposing capability information of resource template of application service in source data network to the application service provider. When the 5G application service provider has this information, and if an edge application service needs to be relocated, then the application service provider can provide some default values using this template to the 5G AF 804 using the provisioning API.

The allow-service-split-during-relocation field can be a Boolean variable indicating support for splitting one application service to multiple application services during relocation. Values for the Boolean variable can include "True" for when a 5G operator is allowed to split an application service in source network to multiple application services in the target edge data network 604 and "False" for when a 5G operator is not allowed to fuse/join/combine multiple application services in source edge data network 602 to one application service in the target edge data network 604.

The allow-service-fusion-during-relocation field can be a Boolean variable indicating support for fusing multiple application service to one application service during relocation. Values for the Boolean variable can include "True" for when a 5G operator is allowed to fuse/join/combine multiple application services in source network to one/few application services in the target network and "False" for when a 5G operator is not allowed to fuse/join/combine multiple application services in source network to one application service in the target network.

The application-service-directory field can include endpoint information of a network service with directory information that provides both a forward mapping of application services (e.g., multiple processing descriptors to one/few processing descriptors—e.g., mapping multiple VNFs/Container images to one VNF/Container) and reverse mapping (e.g., one/few processing descriptors to many processing descriptors—e.g., mapping one VNF/container image to multiple VNFs/Containers).

The image-registry field can be endpoint information of a computing registry that holds VNF and container packages that the 5G AS in the target edge data network 604 can use to download computing images for deployment during relocation.

The support-network-buffering field can be a Boolean variable indicating support for network buffering during relocation. The Boolean variable can include "True" for when a 5G operator is allowed to buffer media content buffer for this media service while the relocation is being performed and "False" for when a 5G operator is not allowed to buffer media content buffer for this media service while the relocation is being performed.

The network-buffer-service field can include endpoint information of a network buffer service. With this field, a network buffer service can be provisioned in a network location that the UE can have access to during application service relocation.

The allow-media-duplication field can be a Boolean variable indicating support for allowing duplicate media and metadata streams to both the source and target data networks during relocation. The Boolean variable can include "True" for when a 5G operator is allowed to use media duplication while the application service is being relocated and "False" for when a 5G operator is not allowed to use media duplication while the application service is being relocated. In this case, the media is sent either to the source application service or the target application service. If this field is set to true, and support for network buffering is enabled using the "support-network-buffering" field, then the media duplication can happen between both the source data network as well as the network media buffer pointed to by the "network-buffer-service" parameter.

The media-duplication-time-period field can include an amount of time duplicate media streams are allowed to flow to or from multiple destinations. When duplication is allowed using the allow-media-duplication field, the amount of time the duplication is allowed is taken from this field.

The allow-metric-inference field can be a variable to indicate whether the 5G AF can use metrics to infer which data network that the UE should be informed to transmit media content to. Possible values of this field could be "True" for when a 5G AF can infer, using metrics from UE and network, the data network that the UE should transfer media content to while the application service is being relocated and "False" for when a 5G AF cannot infer, using metrics from UE and network, the data network that the UE should transfer media content to while the application service is being relocated. With this option, the application service provider enables the 5G operator to take decisions to route UE media content based on available metrics while the application service is being relocated.

The metrics-benchmark field can include a collection of metrics with candidate values using which the 5G AF can determine whether or not the UE should continue to send media data to source data network or if it should start sending media content to a network buffer. Each entry in this collection represents the metric parameter (e.g., e2e delay) and candidate value (e.g., 20 msec).

The force-media-location client-buffering-interval field can indicate the application service provider can force the media content from UE based on this field during the setup of application service in target network. Probable values can include "source" for a UE to continue to send media/metadata to application service instance in source data network, "network-buffer" for when a UE to send media/metadata to network buffer service instance, and "client" for when a UE should buffer media content until the application service instance in the target data network is completely setup.

The client-buffering-interval field can indicate if the media content is buffered in the client using the "force-media-location" parameter, then this field signifies the amount of time the UE should buffer the content before it signals to 5G AF that it can no longer buffer media content.

The client-pause-execution field can represent the amount of time that the UE should pause execution of the application. This applies to the case when the application service in the source or target data networks cannot receive media content while the relocation is taking place and no network buffer can be setup due to operator policies or due to capabilities of the operator network. If the 5G AF presents this option to the UE, then it should take all necessary actions to finish setting up the application service in target network before expiry of this time interval. If the application instance in the target network is completed before expiry of this interval, 5G AF informs the UE of updated endpoint information of application service instance in target data network. Alternatively, if the application service instance in the target network is not completed before expiry of this interval, the AF may inform the UE with a new time interval to extend the expiration. However, in this case, it is up to the UE to continue using the application.

The client-cease-execution field can be a Boolean variable to indicate whether the 5G AF should cease execution of the application if relocation is not possible. Possible values of this field could be "True" for when a 5G AF cease application execution if relocation is not possible and "False" for when a 5G AF may provide alternate deployment if relocation is not possible.

The allow-relocation-with-no-kpi-guarantees field can be a Boolean variable to indicate whether the 5G AF can allow relocation to happen if the target data network cannot guarantee requisite KPI for the application service. Values for this field can include "true" for when a 5G AF allows relocation of application service in spite of the target network's inability to satisfy KPI guarantees and "false" for when a 5G AF does not allow relocation of application service if the target network indicates its inability to satisfy KPI guarantees.

The terminate-application-if-no-kpi-guarantees field can be a Boolean variable to indicate whether the 5G AF terminates the application if the target data network cannot guarantee requisite KPI for the application service. Values for this field can include "True" for when a 5G AF allows terminates the application if target network indicates inability to satisfy KPI guarantees and "False" for when a 5G AF does not allow termination of the application if target network indicates inability to satisfy KPI guarantees. In case this field is set to False, and the field "allow-relocation-with-no-kpi-guarantees" field is set to False, the 5G AF 804 managing the relocation or the application manager in the source network may not relocate the application service, and the instance in the source network can continue to serve the UE in spite of relocation conditions.

The Fallback-application-descriptor field can be a description of application service with reduced/lower quality functionality. The structure of this descriptor is similar to that of the application that is running in the source data network. However, the parameters for the application are lower than that of the currently running application service. Any of the parameters can be reduced to have a reduced functionality application service. Examples of the parameters can include lower bit rate requirements, higher latency requirements, lower throughput requirements, lower hardware requirements (e.g., cpu, gpu, vcpu, vgpu, disk, memory, etc.), lower application quality requirements (e.g., lower resolution, lower video quality, etc.), and lower infrastructure requirements.

The all-or-none-relocation field can be a Boolean variable to indicate whether the 5G AF should relocate all application services together. Values for this field can include "true" for when a 5G AF only allows relocation if all application services in the source data network can be relocated to the target data network and "false" for when a 5G AF may allow relocation if any of the application services in the source data network can be relocated. In case the value is set to False, and only some of the application services can be relocated, then the AF may perform relocation based on all procedures described on a per-application service basis. In case the value is set to True, and if any application service in the source data network cannot be relocated, then no relocation for any of the remaining application services in the source data network may take place. In this case, all the application services continue to operate in the source data network and the UE 806 can continue to use the application services in the source data network even though it may result in application performance degradation.

Although FIG. 9 illustrates a multi edge application service relocation 900, various changes may be made to FIG. 9. For example, the number and placement of various components of the edge application service relocation 900 can vary as needed or desired.

Figure 10:
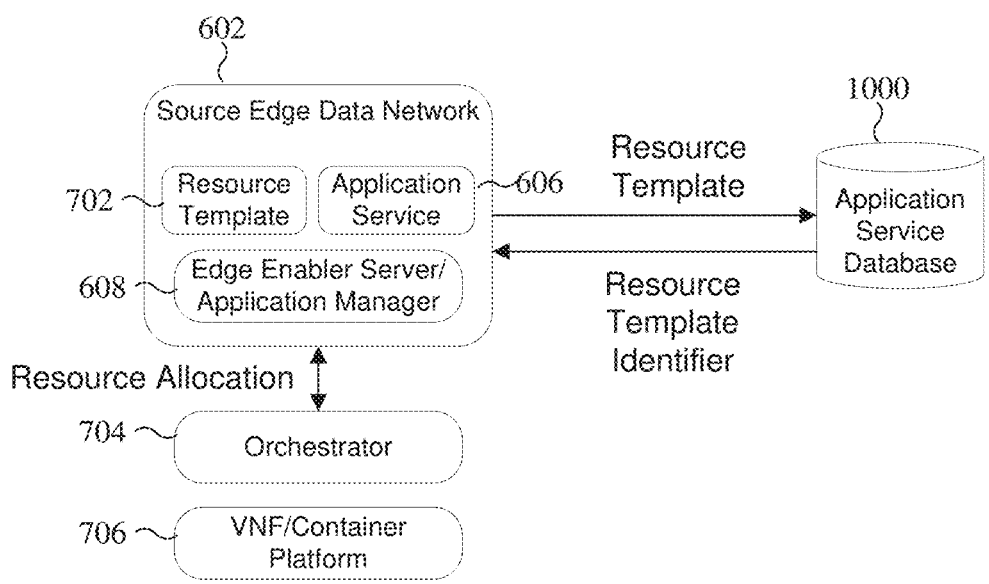
FIG. 10 illustrates an application service database for managing resource templates in accordance with this disclosure.

FIG. 10 illustrates an application service database 1000 for managing resource templates in accordance with this disclosure. The embodiment of the application service database 1000 illustrated in FIG. 10 is for illustration only. FIG. 10 does not limit the scope of this disclosure to any particular implementation of a 5G edge data network.

As shown in FIG. 10, an embodiment described a procedure for provisioning default resource template to a 5G AF which the 5G AF can use in case no resource template is provided by the application manager in source data network when relocating an application service to a target data network. However, unlike procedures described in the other embodiments, the 5G network operator may not be willing to share capability information from source data network the 5G application service provider of the currently deployed resources for the application service. To address this issue, the source data network, instead of sending all the details of the currently deployed resources for the application service to the application service provider, the application manager in the source data network or the 5G AF that is facilitating the relocation can persist information about currently allocated resources to each application service in an application service database. Each entry in the database has an identifier that maps to a resource template.

The application service database can be managed either by the application manager or AF in the source data network, or a separate 5G AF in core network that takes responsibility for managing databases of all connected edge data networks. With this deployment, when an application service is deployed in an edge data network, the resource template of the application service i.e., currently allocated resources to the application service are persisted to this database. When such an information is persisted, the entity managing the application service database returns back with a unique identifier to identify the persisted resource template.

In case where the 5G network operator do not wish the expose capability information to external application service provider, instead of exposing the complete resource template as described in main embodiment, the unique identifier described in this alternative embodiment is exposed to the external application service provider. Along with the unique identifier, a name and endpoint information (e.g., DNS name) of the application service database is also exposed to the external application service provider. When the external application service provider receives this unique identifier and the endpoint information of the application service database, it can provide both of them in provisioning API to signal default resource template information to the 5G AF. When the 5G AF that is managing the relocation reads this identifier and the endpoint information, it can query the application service database to retrieve the default resource template that can be used during application service relocation.

Although FIG. 10 illustrates an application service database 1000, various changes may be made to FIG. 10. For example, the number and placement of various components of the application service database 1000 can vary as needed or desired.

Figure 11:
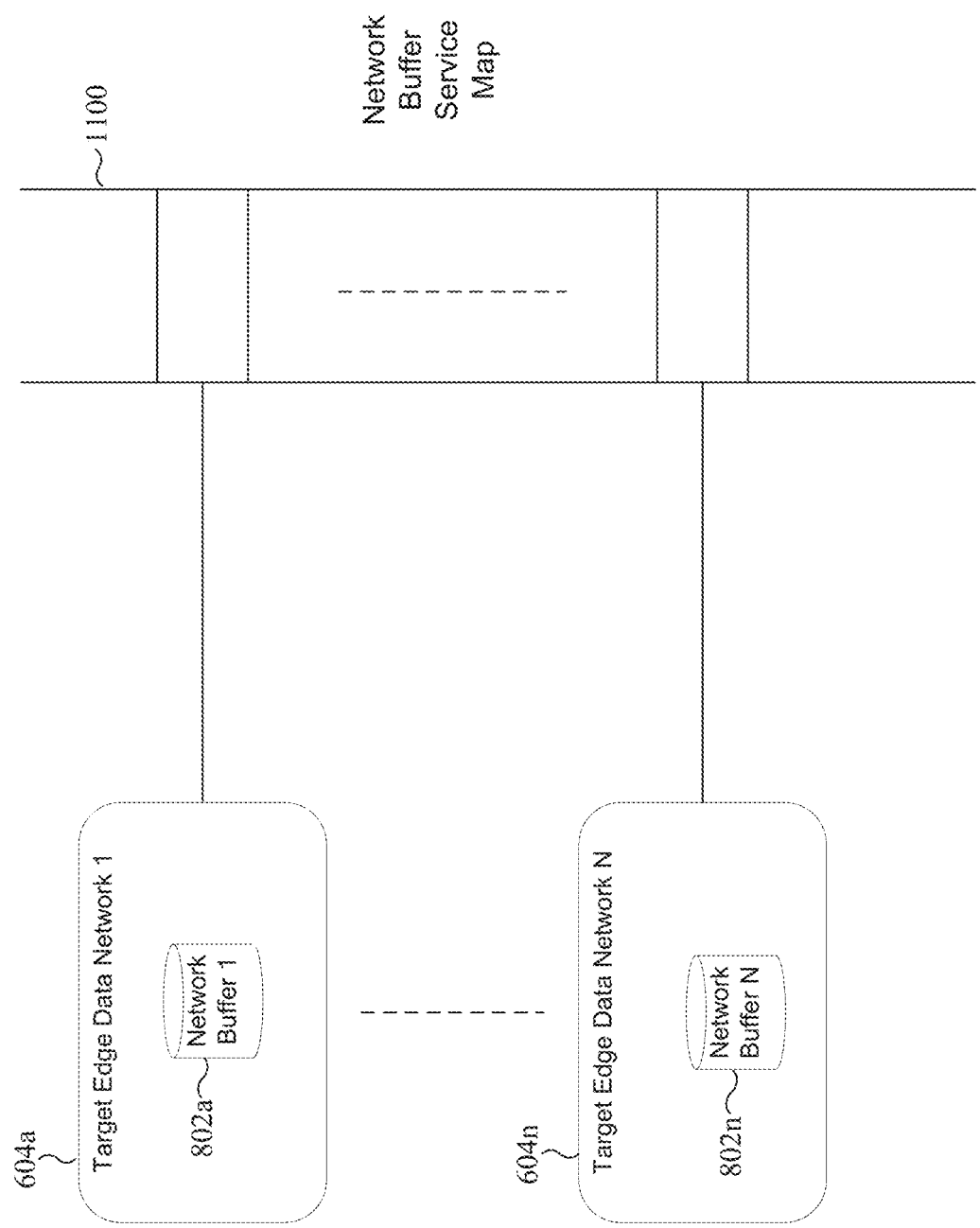
FIG. 11 illustrates a network buffer service map in accordance with this disclosure.

FIG. 11 illustrates a network buffer service map 1100 in accordance with this disclosure. The embodiment of the network buffer service map 1100 illustrated in FIG. 11 is for illustration only. FIG. 11 does not limit the scope of this disclosure to any particular implementation of a 5G edge data network.

A previous embodiment describes method for network buffering during relocation as well as supported service provisioning aspects related to identifying a network media buffer 802 (e.g., in a core network). In certain embodiments, a method of network buffer service maps is shown in FIG. 11.

The provisioning of the media session by the application service provider, instead of just including a single network buffer service, can actually include a map of network buffer services. Each entry in the map is a mapping between the target network identifier and the endpoint information of a network media buffer 802a-802n that is setup in a respective target edge data network 802a-802n.

With this option, each data network operates its own network buffer service. The AF that is managing the relocation can interact with the network buffer service setup in the target network to create a network media buffer 802a-802n that can be used to temporarily buffer media content from UE while the relocation is still happening.

This can be useful because the AF that is managing the AS relocation, instead of using a network buffer service at a remote location, the AF can interact with the network buffer service in the same network that the UE is relocating to i.e., the target data network. Since the UE is relocating to the same network, the post relocation performance of the application is significantly better because the network media buffer 802a-802n that holds media content from the UE during the relocation is in the same network and therefore the transmission of buffered content to the relocated application service is faster.

An embodiment describes a procedure where in either all of the application services can be relocated, or in a partial set of application services among all the available services can be relocated. However, it may be possible that the application service provider may wish to have a say whether or not select application services in a multi-AS deployment can be relocated. To support this, the application service provider may define an "application-service-group" (or "application-server-group"). The members of this group are the set of application services/servers that have to be together in a data network. Therefore, if there is a need for relocation, all the services/servers in this group can be relocated together or can be decided to continue to run in the source data network if they cannot be relocated.

Application Service Group: {App Service 1, App Service 5, . . . App Service N}

The external application service provider can provide the above application-service-groups while provisioning the service to the 5G AF 804. When the 5G AF 804 receives the above application service groups, the 5G AF 804 can relocate all the services together if there is a need to relocate any one of the services within that group.

In case of a multi-AS deployment, if the source data network has a set of application services in addition to an application service group, then the decision to relocate can relocate all application services in the application service group and can check and relocate each of the application service independently in the remaining set of application services in the source data network.

Although FIG. 11 illustrates a network buffer service map 1100, various changes may be made to FIG. 11. For example, the number and placement of various components of the network buffer service map 1100 can vary as needed or desired.

Figure 12:
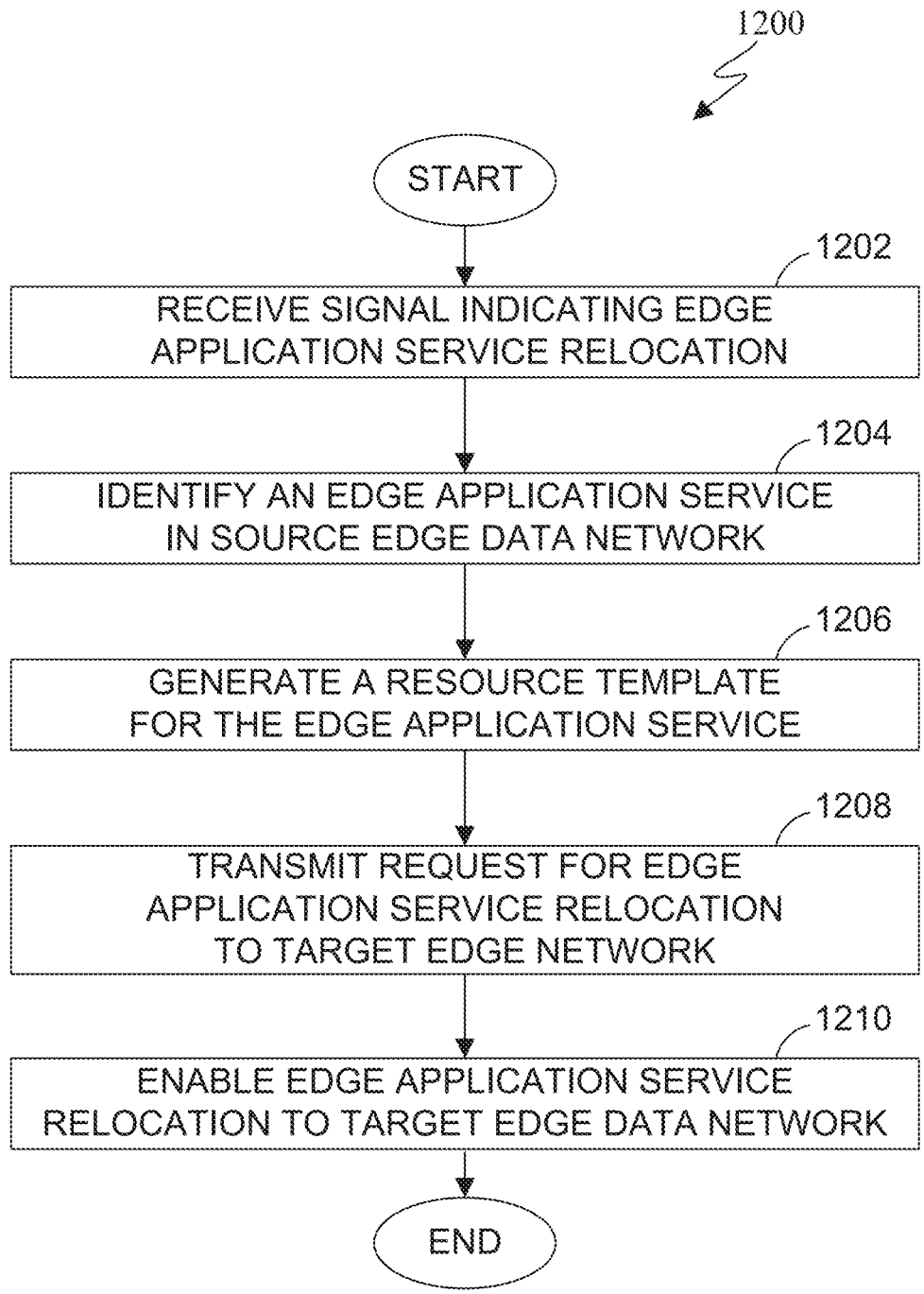
FIG. 12 illustrates an example method for an apparatus of a source edge data network in accordance with this disclosure.

FIG. 12 illustrates an example method 1200 for an apparatus of a source edge data network in accordance with this disclosure. For ease of explanation, the method 1200 of FIG. 12 is described as being performed using the source edge data network 602 of FIGS. 6-11. However, the method 1200 may be used with any other suitable system and any other suitable edge data network.

As shown in FIG. 12, the source edge data network 602 can receive signaling that indicates an edge application service relocation for transferring a user equipment (UE) session to a target edge data network at step 1202. The signaling can be received from a 5G AF, another edge data network, etc. The signaling can be generated based on movement of the UE, functionality of an edge data network, etc.

The source edge data network 602 can identify an edge application service in the source edge data network processing media content corresponding to the UE session at step 1204. In certain embodiments, a specific UE can be utilizing multiple edge application service on the source edge data network. In certain embodiments, the UE can be utilizing media services from application service on multiple edge data networks. For instance, the current source edge data network may only be processing a portion of the media content and remaining contents is processed by a separate edge data network.

The source edge data network 602 can generate a resource template for the edge application service including requirements for running the edge application service at step 1206. The resource template can include specifications for multiple application services used by the UE. In certain embodiments, the resource template can include specifications for application services currently provided by multiple edge data networks to be combined in the target edge data network.

The source edge data network 602 can transmit a request for the edge application service relocation to the target edge data network, the request including the resource template at step 1208. The UE can be instructed to duplicate media content of the UE session to the apparatus and the temporary media buffer.

The source edge data network 602 can enable the edge application service relocation for the UE session from the edge application service at the source edge data network to an edge application service at the target edge data network at step 1210. The source edge data network 602 can receive a response to the request that indicates instantiation of the edge application service in the target edge data network is in progress and a temporary media buffer is available for the UE session. The UE session can have enabled service continuity using the temporary media buffer until instantiation of the edge application service in the target edge data network is completed.

In certain embodiments, the source edge data network 602 can receive a response to the request that indicates that key performance indicators cannot be guaranteed by the target edge data network. An alternative resource template can be provided to the target edge data network 604. The alternative resource template can have a reduced application performance compared to the resource template. The alternative resource template can indicate partial media processing at the target edge data network and remaining media processing at the source edge data network.

In certain embodiments, the source edge data network 602 can receive a response to the request that indicates instantiation of multiple edge application services in the target edge data network for the edge application service relocation for the edge application service at the source edge data network. The edge application service relocation for the UE session can be enabled from the edge application service at the source edge data network 602 to the multiple edge application services at the target edge data network 604.

In certain embodiments, the source edge data network 602 can receive a response to the request that indicates instantiation of the edge application service in the target edge data network 604 is in progress and a buffer in the UE is available for the UE session. Service continuity of the UE session can be enabled using the buffer in the UE until instantiation of the edge application service in the target edge data network is completed.

Although FIG. 12 illustrates one example of a method 1200 for an apparatus of a source edge data network, various changes may be made to FIG. 12. For example, while shown as a series of steps, various steps in FIG. 12 may overlap, occur in parallel, or occur any number of times.

Figure 13:
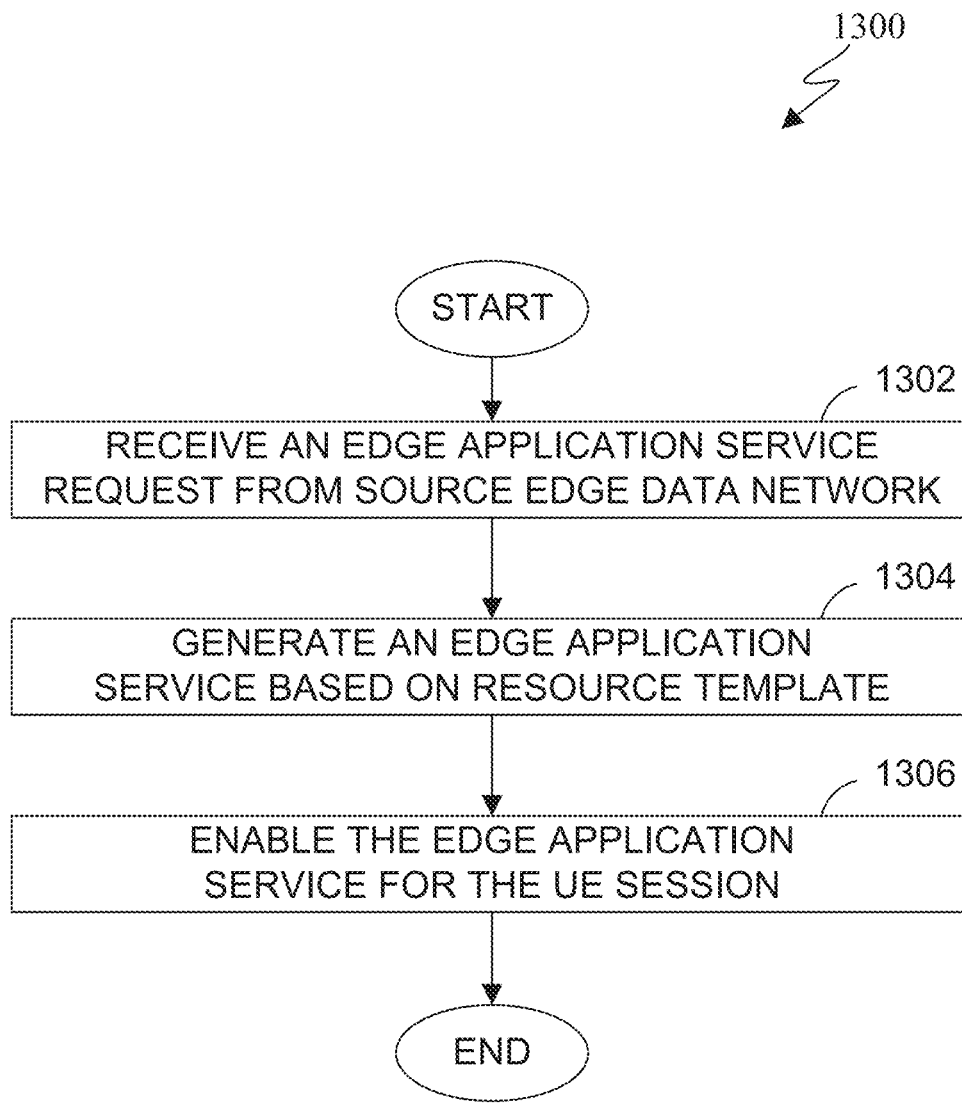
FIG. 13 illustrates an example method for an apparatus of a target edge data network in accordance with this disclosure.

FIG. 13 illustrates an example method 1300 for operating an apparatus of a target edge data network according to this disclosure. For ease of explanation, the method 1300 of FIG. 13 is described as being performed using an apparatus of a target edge data network 604 of FIGS. 6-11. However, the method 1300 may be used with any other suitable system and any other suitable an apparatus of an edge data network.

As shown in FIG. 13, the target edge data network 604 can receive, from a source edge data network, a request for an edge application service relocation for a user equipment (UE) session receiving media content from an edge application service at the source edge data network, the request including a resource template to the target edge data network at step 1302.

The target edge data network 604 can transmit a response to the request that indicates instantiation of the edge application service in the target edge data network is in progress and a temporary media buffer is available for the UE session. The UE session can have enabled service continuity using the temporary media buffer until instantiation of the edge application service in the target edge data network is completed.

In certain embodiments, the target edge data network 604 can transmit a response to the request that indicates that key performance indicators cannot be guaranteed by the target edge data network. An alternative resource template can be provided to the target edge data network 604. The alternative resource template can have a reduced application performance compared to the resource template. The alternative resource template can indicate partial media processing at the target edge data network and remaining media processing at the source edge data network.

In certain embodiments, the target edge data network 604 can transmit a response to the request that indicates instantiation of multiple edge application services in the target edge data network for the edge application service relocation for the edge application service at the source edge data network. The edge application service relocation for the UE session can be enabled from the edge application service at the source edge data network 602 to the multiple edge application services at the target edge data network 604.

In certain embodiments, the target edge data network 604 can transmit a response to the request that indicates instantiation of the edge application service in the target edge data network 604 is in progress and a buffer in the UE is available for the UE session. Service continuity of the UE session can be enabled using the buffer in the UE until instantiation of the edge application service in the target edge data network is completed.

The target edge data network 604 can generate an edge application service based on the resource template at step 1304. In certain embodiments, multiple edge application services based on the resource template can be instantiated. The target edge data network 604 can generate a divided application service when the resources of the target edge data network 604 are not sufficient for processing the media content at the specifications in the resource template.

The target edge data network 604 can enable the edge application service relocation for the UE session from the edge application service at the source edge data network to the generated edge application service based on the resource template at step 1306.

Although FIG. 13 illustrates one example of a method 1300 for an apparatus of a target edge data network, various changes may be made to FIG. 13. For example, while shown as a series of steps, various steps in FIG. 13 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus of a source edge data network, the apparatus comprising:
a communication interface configured to receive signaling that indicates an edge application service relocation for transferring a user equipment (UE) session for a UE to a target edge data network; and
a processor operably coupled to the communication interface, the processor configured to:
identify an edge application service in the source edge data network processing media content corresponding to the UE session;
generate a list of requirements for running the edge application service;
transmit a request for the edge application service relocation to the target edge data network, the request including the list of requirements;
receive a response to the request, wherein the response indicates instantiation of the edge application service in the target edge data network is in progress or complete; and
enable the edge application service relocation for the user equipment from the edge application service at the source edge data network to an edge application service at the target edge data network.

2. The apparatus of claim 1, wherein:
when instantiation of the edge application service in the target edge data network is in progress, a temporary media buffer is available for the UE session, and
the processor is further configured to enable service continuity of the UE session using the temporary media buffer until instantiation of the edge application service in the target edge data network is completed.

3. The apparatus of claim 2, wherein the processor is further configured to instruct the UE to duplicate media content of the UE session to the apparatus and the temporary media buffer.

4. The apparatus of claim 1, wherein the processor is further configured to:
receive a response to the request indicating that key performance indicators cannot be guaranteed by the target edge data network, and
provide an alternative list of requirements to the target edge data network.

5. The apparatus of claim 4, wherein the alternative list of requirements has a reduced application performance compared to the list of requirements.

6. The apparatus of claim 4, wherein the alternative list of requirements indicates partial media processing at the target edge data network and remaining media processing at the source edge data network.

7. The apparatus of claim 1, wherein the processor is further configured to:
receive a response to the request that indicates instantiation of multiple edge application services in the target edge data network for the edge application service relocation for the edge application service at the source edge data network, and
enable the edge application service relocation for the UE session from the edge application service at the source edge data network to the multiple edge application services at the target edge data network.

8. The apparatus of claim 1, wherein:
the processor is further configured to access an application service directory that includes mapping information for splitting or fusing the edge application service to facilitate the edge application service relocation; and
the mapping information includes:
(i) a forward mapping from multiple processing descriptors in the source edge data network to a single processing descriptor in the target edge data network, or
(ii) a reverse mapping from a single processing descriptor in the source edge data network to multiple processing descriptors in the target edge data network.

9. A method for an edge application service relocation from a source edge data network to a target edge data network, the method comprising:
receiving signaling that indicates an edge application service relocation for transferring a user equipment (UE) session to the target edge data network;
identifying an edge application service in the source edge data network processing media content corresponding to the UE session;
generating a list of requirements for running the edge application service;
transmitting a request for the edge application service relocation to the target edge data network, the request including the list of requirements;
receiving a response to the request, wherein the response indicates instantiation of the edge application service in the target edge data network is in progress or complete; and
enabling the edge application service relocation for the UE session from the edge application service at the source edge data network to an edge application service at the target edge data network.

10. The method of claim 9, wherein when instantiation of the edge application service in the target edge data network is in progress, a temporary media buffer is available for the UE session, and
the method further comprising enabling service continuity of the UE session using the temporary media buffer until instantiation of the edge application service in the target edge data network is completed.

11. The method of claim 10, further comprising:
instructing the UE to duplicate media content of the UE session to the source edge data network and the temporary media buffer.

12. The method of claim 9, further comprising:
receiving a response to the request indicating that key performance indicators cannot be guaranteed by the target edge data network, and
providing an alternative list of requirements to the target edge data network.

13. The method of claim 12, wherein the alternative list of requirements has a reduced application performance compared to the list of requirements.

14. The method of claim 12, wherein the alternative list of requirements indicates partial media processing at the target edge data network and remaining media processing at the source edge data network.

15. The method of claim 9, further comprising:
receiving a response to the request that indicates instantiation of multiple edge application services in the target edge data network for the edge application service relocation for the edge application service at the source edge data network, and
enabling the edge application service relocation for the UE session from the edge application service at the source edge data network to the multiple edge application services at the target edge data network.

16. The method of claim 9, further comprising:
accessing an application service directory that includes mapping information for splitting or fusing the edge application service to facilitate the edge application service relocation,
wherein the mapping information includes:
(i) a forward mapping from multiple processing descriptors in the source edge data network to a single processing descriptor in the target edge data network, or
(ii) a reverse mapping from a single processing descriptor in the source edge data network to multiple processing descriptors in the target edge data network.

17. An apparatus of a target edge data network, the apparatus comprising:
a communication interface configured to receive, from a source edge data network, a request for an edge application service relocation for a user equipment (UE) session receiving media content from an edge application service at the source edge data network, the request including a list of requirements to the target edge data network; and
a processor operably coupled to the communication interface, the processor configured to:
generate an edge application service based on the list of requirements;
transmit a response to the request, wherein the response indicates instantiation of the edge application service in the target edge data network is in progress or complete; and
enable the edge application service relocation for the UE session from the edge application service at the source edge data network to the generated edge application service based on the list of requirements.

18. The apparatus of claim 17, wherein the processor is further configured to:
transmit a response to the request indicating that key performance indicators cannot be guaranteed by the target edge data network, and
receive an alternative list of requirements to the target edge data network.

19. The apparatus of claim 18, wherein the alternative list of requirements has a reduced application performance compared to the list of requirements.

20. The apparatus of claim 18, wherein the alternative list of requirements indicates partial media processing at the target edge data network and remaining media processing at the source edge data network.

* * * * *